United States Patent [19]
DeCoux

[11] Patent Number: 5,316,032
[45] Date of Patent: May 31, 1994

[54] METHOD AND APPARATUS FOR LAMINAR FLOW CONTROL

[75] Inventor: Steven P. DeCoux, Long Beach, Calif.

[73] Assignee: Rockwell International Corporation, Seal Beach, Calif.

[21] Appl. No.: 113,585

[22] Filed: Aug. 27, 1993

Related U.S. Application Data

[63] Continuation of Ser. No. 909,475, Jul. 6, 1992, abandoned.

[51] Int. Cl.$^5$ ............................................. F15C 3/00
[52] U.S. Cl. .................................... 137/14; 137/825; 137/829; 137/561 A; 137/597; 244/207; 244/209
[58] Field of Search ................. 137/14, 825, 829, 597, 137/561 A, 1; 244/207, 208, 209

[56] References Cited

U.S. PATENT DOCUMENTS

| | | | |
|---|---|---|---|
| 3,309,042 | 3/1967 | Edwards | 244/42 |
| 3,613,708 | 1/1971 | Kampe et al. | 137/829 |
| 3,901,277 | 8/1975 | Viets | 137/829 |
| 4,027,407 | 6/1977 | Kiss | 137/829 |
| 4,392,621 | 7/1983 | Viets | 137/829 |

Primary Examiner—A. Michael Chambers
Attorney, Agent, or Firm—Terrell P. Lewis; Charles T. Silberberg

[57] ABSTRACT

A method and apparatus for establishing discrete zones of pressure at the surface of a perforated panel of the type typically used for laminar fluid flow control includes a first array of channel members fluidly communicating with perforations in the panel, all of the channel members in the first array extending in a first direction and being substantially parallel to one another, and a second array of channel members fluidly communicating with the fluid in the first array of channel members, all of the channel members in the second array extending in a second direction and being substantially parallel to one another, where the first and second arrays of channel members being disposed in crossing relationship with a source of pressure being applied to the second array of channel members. By this arrangement, control of fluid flow in at least one of the first and second arrays results in discrete zones of pressure at the surface of the panel. Various additional embodiments include variable sized apertures in the second array of channels and various condition-responsive actuators for the apertures.

19 Claims, 1 Drawing Sheet

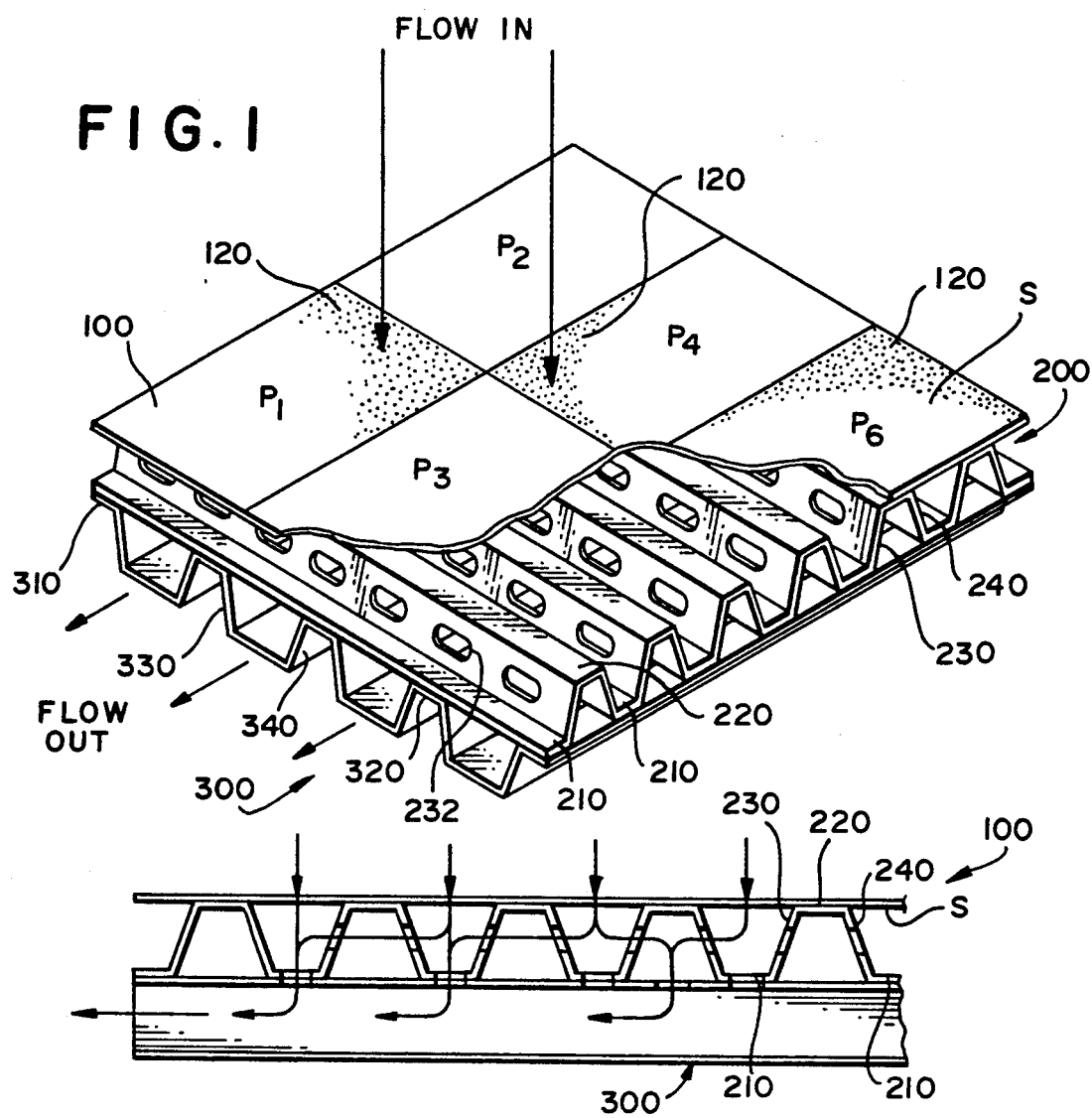
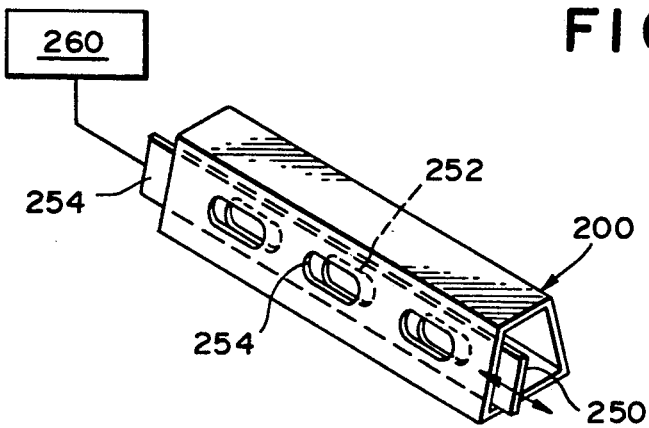

METHOD AND APPARATUS FOR LAMINAR FLOW CONTROL

This is a continuation of copending application Ser. No. 07/909,475 filed on Jul. 6, 1992, now abandoned.

BACKGROUND OF THE INVENTION

1. Field of the Invention

The present invention relates to laminar flow control apparatus, and more particularly to a method and apparatus for defining discrete zones of pressure at the surface of a laminar flow control member.

2. Background of the Invention

Panels having surface perforations through which compressible and incompressible fluids are introduced to control the flow of fluid over the surface are well known. Such panels, known as laminar flow control panels, are based on the premise that fluid flowing over the surface of the panel will be closely entrained along the contour of the surface via a suction force generated within the panel and "visible" to and acting on the fluid flowing over the panel surface through perforations in the panel. Laminar flow control has proven very useful in controlling fluid flow over or around surfaces immersed in various fluid environments.

A typical laminar flow control panel comprises a multi-layer structure including inner and outer skins and one or more interior members delimiting compartments within the panel. The interior members may be wall partitions, honeycomb or truss core structures, or corrugated elements bonded at selected regions to the inner and outer skins. The panel skins may be of any thickness and material, with emphasis generally being on minimized weight, and maximum strength and workability. The skin perforations may be provided with hole-spacing tailored for optimum suction distribution.

Factors which typically influence design of these panels include the known or anticipated pressure distribution over the region to be laminarized; skin perforation patterns, size and spacings; and internal flow requirements and capabilities. Control of the latter factor influences the pressure distribution required over the suction surface for a range of desired conditions.

OBJECTS AND SUMMARY OF THE INVENTION

It is therefore an object of the present invention to provide a novel method and apparatus for controlling fluid flow over a surface of a laminar flow control panel which will overcome all the deficiencies and drawbacks of currently known apparatus of like kind.

Another object of the present invention is to provide a novel system of fluid flow paths within a laminar flow control panel for directing flow of fluid from one region of the interior of the panel to another.

Another object of the invention is to provide dissimilar pressure fields at the surface of a laminar fluid control panel to create distinct zones of fluid flow over the surface at adjacent regions, such that disturbances in the flow of fluid over the entire surface are minimized and laminar flow of the fluid over the surface is attainable.

Still another object of the invention is to provide a novel system of fluid flow paths for varying the flow of fluid along the paths within a panel such that the pressure of fluid flowing over the panel perforated surface is affected by the flow of fluid within the panel.

These and other objects are achieved by providing a first array of flow paths extending in a first direction and a second array of flow paths extending in a second direction, where the first and second directions are neither parallel nor coincident, and preferably are at substantial angles to one another. In a preferred embodiment of the invention, the first and second flow path arrays respectively comprise channel members disposed immediately atop one another, and one of the first or second arrays is located immediately beneath the perforated panel. Apertures of fixed or variable size and shape are provided in walls of the channel members at predetermined locations to facilitate intercommunication of the flow path arrays with one another and with the perforated surface.

BRIEF DESCRIPTION OF THE DRAWINGS

FIG. 1 is a sectional view of a portion of a multi-layer channel assembly for delimiting discrete pressure zones at a surface of a laminar flow control panel in accordance with the teachings of the present invention; and FIG. 2 is a cross-sectional view of the multi-layer channel assembly shown in FIG. 1.

FIG. 3 is a cross-sectional view of a channel member with apertures illustrating an aperture size-altering mechanism.

DETAILED DESCRIPTION OF THE INVENTION

Referring first to FIG. 1, there is shown a laminar flow control panel 100 of the type contemplated by the present invention. Panels of this type have proven useful in such applications as aerodynamic control surfaces, nautical control surfaces, and machine control mechanisms. Located below the panel is a multi-layered structure 200 defining a first array of channels or paths and a second array of channels or paths. It is to be understood that the panel and multi-layered structure shown in FIG. 1 is only a part of an entire laminar flow control panel assembly.

The length and width of such a panel assembly can be chosen as required. It is further to be understood that the panel assembly will be manufactured to have side wall members extending substantially normal to the plane of the panel 100 and spanning the outer surface S of the panel and the lowermost reaches of the multi-layered structure 200, thereby enclosing one or more sides of the panel assembly.

Panel 100 is shown as having patterns 120 of perforations located at specified regions. While discrete patterns have been shown, it is to be understood that the entire surface of panel 100 could be provided with perforations. These perforations provide means through which fluid located beneath (and within the structure defined below) panel 100 can pass. In enabling movement of fluid through the perforations either into or out of the environment defined beneath panel 100, the pressure of fluid passing over the outer surface S of the panel can be altered so as to define discrete pressure zones at the surface S. Of course, all of the zones at the surface S may have the same pressure; however, it is further contemplated, within the scope of teachings of this invention, that the zones at the surface S can be distinct, and can be controlled by variation of the amount of fluid flowing through the environment beneath the panel 100.

Disposed below panel 100 is a first array 200 of channels, and a second array 300 of channels. The channels in each array are delimited by channel members, which are depicted in FIG. 1 as having substantially similar configurations. It is to be understood that the channel members may be comprised of corrugated structural elements as shown in FIG. 1, or the channel members may be a series of partition walls of any similar or dissimilar shape or configuration which divide the space between the panel 100 and the second array 300 of channels into discrete fluid flow paths.

Each of the channel members in the first array of channels comprise base members 210, a hat member 220, and interconnecting side wall members 230, 240. Adjacent base members 210 of neighboring channel members run into, and may be unitary with (as shown in FIG. 1 of the drawing), one another, so that the channel members in their side-by-side disposition form the first array.

Disposed below the first array of channel members 200 is a second array of channel members 300. Preferably, the first and second arrays of channel members have the same configuration; however, this is not mandatory. Each of the channel members in the second array of channels comprises a base member 310, a hat member 320, and interconnecting side wall members 330, 340. Adjacent base members 310 of neighboring channel members extend toward, and may be unitary with (as shown in FIG. 1 of the drawing), one another, so that the channel members in their side-by-side disposition form the second array. In addition, the second array of channel members is preferably secured or joined, as by bonding or welding, to the first array of channel members. This is accomplished, as shown in FIG. 1, by attachment of the hat members 320 of the second array of channel members to the base members 210 of the first array of channel members, where the first and second arrays are disposed at angles to one another, and preferably at about right angles to one another.

Referring to FIGS. 1 and 2, side wall members 230 and 240 include apertures 232 and 242, respectively. The location and size of the apertures are determined according to mathematical and computer models and as a function of known or desired pressure distributions and gradients on the surface of panel 100 and desired pressure distributions and gradients in each of the pressure zones $P_i$, where $i=1, 2, 3, \ldots$ (as shown in FIG. 1).

Apertures are also provided in the hat members 320 of the second array of channel members. The location and size of these apertures are predetermined in the same manner and based on the same criteria as for the apertures provided in the side wall members of the first array. The apertures in the side wall members of the first array communicate the fluid environment located above the panel 100 with the successive channel-configured fluid environments defined within the first array 200 of channel members. The apertures in the hat members 320 of the second array of channel members communicate the fluid environment located below the panel 100 disposed within the successive channel-configured fluid environments of the first array 200 with alternating channel-configured fluid environments disposed within each of respectively alternating channel members 300 defining the second array of channel members.

In use, a source of pressure, either positive or negative, is fluidly connected with the second array of channel members, and through the unique arrangement (i.e., size and location) of apertures disclosed above, discrete zones of pressure are established at the surface of the perforated panel thereby enabling laminar fluid flow control of the fluid passing over the surface.

Referring to FIG. 3 now, there is generally shown structure capable of altering the size of the apertures 232 in each of the channel members of the first array. As shown in this example, a plate 250 is slidably supported on a side wall member 230 in which the apertures 232 have been formed. Plate 250 is provided with openings 252 which preferably correspond in location and size with the apertures 232. The plate is slidably movable along the axis of the channel member so that the openings 252 can be displaced at various locations between one position in which each of the openings substantially overlap a corresponding one of the apertures 232 to a second position in which each of the openings is substantially removed from a corresponding one of the apertures 232. Thus, the "effective" size of the apertures 232 can be varied between being substantially entirely open to substantially entirely closed.

Movement of the plate 250 relative to the side wall member 230 of the channel member can be effected through various mechanisms. For example, the plate 250 could be controlled using a remote actuator, such as radio or microwave actuators. The plate could alternatively be controlled using an ambient condition actuator, i.e., one which reacts in response to an ambient condition such as temperature, air flow speed, turbulence, etc. Mechanisms for effecting movement of the plate can be electrical, pneumatic, mechanical or hydraulic and such mechanisms are collectively represented in FIG. 3 by the block 260.

Thus it is apparent that there has been provided, in accordance with the present invention, an apparatus and method for controlling pressure at the surface of a perforated panel which fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, the present invention is intended to embrace all such alternatives, modifications, and variations which fall within the spirit and scope of the appended claims.

What I claim is:

1. A method for controlling flow of fluid over a panel of the type typically used for laminar fluid flow control, said system comprising:

providing a plurality of perforations extending over substantially the entire surface of said panel, arranging a first array of channel members beneath said perforated panel, and providing means in said first array of channel members for fluidly communicating at least a subset of said perforations in said panel with said first array of channel members, arranging a second array of channel members beneath said first array of channel members, and providing means in said second array of channel members for fluidly communicating said second array of channel members with said first array of channel members, and applying a source of pressure to one end region of said second array of channel members.

whereby by selecting appropriate locations for said fluidly communicating means, the flow of fluid between said first and second arrays, and consequently between said first array and at least said subset of said perforations in the panel, can be controlled in a predetermined manner.

2. The method of claim 1, wherein said step of providing means in said second array of channel members for fluidly communicating said second array of channel members with said first array of channel members comprises providing variable sized openings in said second array of channel members and means for selectively varying the size of said openings in response to predetermined inputs, whereby upon altering the size of said openings, variation of fluid flow through said panel perforations can be effected thereby achieving control of fluid over the panel surface.

3. The method of claim 2, and further including the step of actuating said communicating means in said second array of channel members in response to an ambient condition.

4. The method of claim 2, and further including the step of actuating said communicating means in said second array of channel members in response to an externally supplied actuating signal.

5. A system for establishing discrete zones of pressure at the surface of a panel of the type typically used for laminar fluid flow control, said system comprising:
- a plurality of perforations extending over substantially the entire surface of said panel,
- a first array of channel members including means for fluidly communicating said first array with at least a subset of said perforations in the panel, and
- a second array of channel members including means for fluidly communicating said second array with the fluid in the first array of channel members,
- said first and second arrays of channel members being disposed in overlying relationship with a source of pressure being applied to said second array of channel members,
- means for controlling fluid flow in at least one of the first and second arrays to provide discrete zones of pressure at said surface.

6. The system of claim 5, wherein each of said first and second arrays of channel members include aperture means at predetermined regions, whereby said source of pressure fluidly interacts with the flow of fluid over said surface of said laminar flow control panel.

7. The system of claim 6, wherein said first array of channel members extend in a first geometric pattern, and said second array of channel members extend in a second geometric pattern.

8. The system of claim 5, and further including means, associated with at least one of said first and second array of channel members, for alterably communicating fluid environments in said at least one array of channel members with the fluid environment in which the surface of the panel is awash.

9. The system of claim 5, wherein said means for fluidly communicating said first array with perforations in the panel comprises apertures having an opening of at least one size.

10. The system of claim 9, wherein said means for fluidly communicating said first array with perforations in the panel further comprises means for changing the size of said apertures.

11. The system of claim 10, wherein said means for changing the size of said apertures comprises plate means slidably supported on a side of a channel member.

12. The system of claim 10, wherein said means for changing the size of said apertures includes remotely controlled actuators.

13. The system of claim 10, wherein said means for changing the size of said apertures includes actuators responsive to conditions associated with at least one of said laminar flow control panel, said first array of channels, said second array of channels or said source of pressure.

14. The system of claim 10, wherein said means for changing the size of said apertures includes temperature-responsive actuators.

15. Apparatus for establishing distinct pressure fields at adjacent regions of a surface of a perforated panel typically used for laminar fluid flow control, said apparatus comprising:
- a first plurality of channel members arranged side-by-side and including means for fluidly communicating said first plurality channel members with perforations in the panel,
- a second plurality of channel members arranged side-by-side and including means for fluidly communicating said second plurality channel members with the fluid in the first plurality channel members,
- said first plurality channel members being disposed behind said perforated panel, said second plurality channel members being disposed behind said first plurality channel members, and said channel members of said first plurality being arranged in nonparallel relationship to said channel members of said second plurality,
- pressure means applied to said second plurality channel members,
- and means for controlling the rate of fluid in at least one of the first and second plurality channel members to create unique zones of pressure at adjacent regions of said perforated panel surface.

16. The system of claim 1, wherein said subset comprises a non-lineal region of said panel.

17. The system of claim 1, wherein said subset comprises an areal region of said panel.

18. The method of claim 16, wherein said subset comprises a non-lineal region of said panel.

19. The method of claim 16, wherein said subset comprises an areal region of said panel.

* * * * *